(12) United States Patent
An (10) Patent No.: US 8,857,687 B1
(45) Date of Patent: Oct. 14, 2014

(54) CAR MOUNT FOR AN ELECTRONIC DEVICE

(76) Inventor: Byungseol An, Tuxedo, NY (US)

(*) Notice: Subject to any disclaimer, the term of this patent is extended or adjusted under 35 U.S.C. 154(b) by 153 days.

(21) Appl. No.: 13/584,808

(22) Filed: Aug. 13, 2012

Related U.S. Application Data (60) Provisional application No. 61/574,921, filed on Aug. 11, 2011.

(51) Int. Cl.
*B60R 11/00* (2006.01)

(52) U.S. Cl.
USPC .......................... 224/482; 224/483; 224/282

(58) Field of Classification Search
USPC .................................. 224/482, 483, 279, 282
See application file for complete search history.

(56) References Cited

U.S. PATENT DOCUMENTS

| | | | | |
|---|---|---|---|---|
| 567,531 | A * | 9/1896 | Arnold | 248/274.1 |
| 1,590,227 | A * | 6/1926 | Britton | 248/103 |
| 4,023,757 | A * | 5/1977 | Allard et al. | 248/70 |
| 4,842,174 | A * | 6/1989 | Sheppard et al. | 224/548 |
| 4,962,874 | A * | 10/1990 | Hagglund | 224/277 |
| 5,086,958 | A * | 2/1992 | Nagy | 224/544 |
| 5,187,744 | A * | 2/1993 | Richter | 379/449 |
| 5,568,549 | A * | 10/1996 | Wang | 379/446 |
| 5,779,205 | A * | 7/1998 | Ching | 248/205.8 |
| 5,979,724 | A * | 11/1999 | Loewenthal et al. | 224/483 |
| 5,996,956 | A | 12/1999 | Shawver | |
| 6,062,518 | A * | 5/2000 | Etue | 248/231.21 |
| 6,085,113 | A | 7/2000 | Fan | |
| 6,149,116 | A | 11/2000 | Won | |
| 6,158,793 | A * | 12/2000 | Castro | 296/1.07 |
| 6,427,959 | B1 * | 8/2002 | Kalis et al. | 248/288.11 |
| 6,779,765 | B2 | 8/2004 | Zheng | |
| 6,932,309 | B1 | 8/2005 | Corey | |
| 7,062,300 | B1 | 6/2006 | Kim | |
| D533,055 | S * | 12/2006 | Brassard | D8/373 |
| 7,292,881 | B2 * | 11/2007 | Seil et al. | 455/575.1 |
| 7,320,450 | B2 * | 1/2008 | Carnevali | 248/160 |
| 7,475,858 | B2 | 1/2009 | Kalis | |
| 8,191,838 | B2 * | 6/2012 | Carter | 248/188.6 |
| 8,215,596 | B2 | 7/2012 | Duan | |
| 8,276,863 | B2 * | 10/2012 | Niwa et al. | 248/278.1 |
| 2006/0060733 | A1 | 3/2006 | Tsai | |
| 2006/0215836 | A1 | 9/2006 | Wang | |
| 2010/0081377 | A1 | 4/2010 | Chatterjee | |
| 2011/0278885 | A1 * | 11/2011 | Procter et al. | 297/135 |
| 2012/0048902 | A1 | 3/2012 | Clochard | |
| 2012/0205412 | A1 * | 8/2012 | Choi | 224/483 |

* cited by examiner

*Primary Examiner* — Brian D Nash
(74) *Attorney, Agent, or Firm* — Alan Wolf

(57) ABSTRACT

An aftermarket vehicle mount for an electronic device (e.g., a tablet computer) consists of an extensible mounting base, one end of which removably attaches to a windshield, the other end of which rotatably attaches to an electronic device holder. The electronic device holder grasps an electronic device with spring-loaded arms. The extensible mounting base has a folded configuration, in which the electronic device rests flat on the top of a dashboard, and an unfolded configuration, in which the electronic device drapes over the front of the dashboard, at an appropriate viewing angle for a passenger. In either configuration, the electronic device may be easily rotated between landscape and portrait orientations, but unwanted motion of the electronic device from sudden accelerations (e.g., from encountering a pothole) is minimized. Embodiments suitable for home and office are also contemplated.

18 Claims, 11 Drawing Sheets

CAR MOUNT FOR AN ELECTRONIC DEVICE

CROSS-REFERENCE TO RELATED APPLICATIONS

This Non-Provisional US Patent Application claims priority to the Provisional Application "CAR MOUNT FOR AN ELECTRONIC DEVICE"—Ser. No. 61/574,921, filed Aug. 11, 2011.

FEDERALLY SPONSORED RESEARCH

None.

SEQUENCE LISTING

None.

BACKGROUND

1. Field of the Invention

The present invention relates to a mount for an electronic device such as a tablet computer, an eBook reader, a smart cell phone, or a PDA. In particular, the present invention relates to an adjustable mount for an electronic device that can be fastened to the dashboard, windshield, or the interior wall of a motor vehicle.

2. Description of Related Art

Portable electronic devices such as the Apple® Ipad, Android® Tablet computers, and "smart" cell phones, are increasingly popular. Such devices are often equipped with 3G /WiFi/4G communication capabilities. Owners of these electronic devices are used to carrying them and using them everywhere, and do not wish to be deprived of their use during vehicular travel.

Some of these devices, such as Tablet computers and smart phones, are particularly useful in a motor vehicle, for functions that include real time traffic information, maps, internet-based information about restaurants and lodging, as well as routine internet functions such as receiving texts and email and conducting web searches. Other electronic devices, such as MP3 players, may lack advanced communication capabilities, but may still be desirable for use in motor vehicles. Few vehicles come equipped with suitable mounts that permit a driver or front seat passenger to conveniently access and interact with their electronic devices. Similarly, conventional 'third party' in-vehicle mounts for such devices have been imperfect.

U.S. Pat. No. 6,932,309 to Corey (2005) shows a holder for an electronic device consisting of a flat base, a length of flexible cord, and a pair of mounting wedges attached to the ends of the cord. An electronic device in such a holder may shift as the car accelerates, and the cord used to secure the electronic device to the base may interfere with keyboard and screen interactions with, e.g., a tablet computer.

U.S. Pat. No. 5,996,956 to Shawver (1999) shows a mounting platform for electronic devices which might provide a more stable and secure connection to the dashboard of a car than Corey's holder, but would be highly specific to a particular form factor of the electronic device. Further, Shawver's platform holds the electronic device in a single orientation, which is undesirable for devices such as tablet computers or cell phones, for which a user may wish to alternate between "landscape" and "portrait" orientations. Additionally, fixing the electronic device in a single orientation may prevent the device from being properly viewable or usable by another occupant in the vehicle.

Published Pat. Application No. US 2006/0215836 to Wang shows an electronic device holder consisting of a body and a clamping assembly, but no means is provided for conveniently affixing and removing the holder to the interior of a vehicle, or for allowing the electronic device to be switched between landscape and portrait orientation.

U.S. Pat. No. 7,062,300 to Kim (2006) shows an electronic device holder that similarly prevents the user from changing between landscape and portrait orientations. Kim's device employs a ball joint connection to the vehicle's dashboard, which is likely to either to be too stiff for easy adjustment or too loose to resist vehicle accelerations. Further, the electronic device sits above the dashboard which may interfere with the driver's view of the road. In some jurisdictions, a device sitting substantially above the dashboard may violate a local traffic regulation.

Electronic device holders or mounts that are presently available can often only be used with a specific model or size of electronic device. Such holders or mounts may require complex adjustments and generally do not permit the device to be rotated in ninety degree increments. Additionally, such holders or mounts may require a specific location or device within the vehicle, such as a car seat's cup holder, that may already be in use or is inconvenient for operation of the electronic device.

There is a need for an electronic device mount for a vehicle that is simple to operate, provides a stable platform for devices of diverse form factors, does not interfere with access to or visibility of the device's inputs and outputs, allows for the electronic device to be affixed to a dashboard or windshield, and allows for the device to be held at preferred angular positions, such as portrait and landscape orientation, for the benefit of the driver or another occupant of the vehicle.

SUMMARY OF THE INVENTION

The present apparatus is a car mount for an electronic device such as a Tablet Computer, an eBook reader, a smart phone, or a PDA. The car mount generally comprises an extensible mounting base that removably attaches to the windshield, dashboard, or interior wall of a vehicle and an electronic device holder rotatably connected to the mounting base so the electronic device may be held at a preferred angular orientation. The invention will permit the electronic device to be located in either of two positions—resting on the upper surface of the vehicle's dashboard so the screen or front surface of the electronic device is predominantly horizontal, or draped over the front of a dashboard, so the front face of the electronic device is tilted somewhat away from vertical, at an angle appropriate for driver or passenger viewing.

DETAILED DESCRIPTION OF THE PREFERRED EMBODIMENTS

The invention will now be described with reference to FIGS. 1-11. It should be understood that these figures are exemplary in nature and in no way serve to limit the scope of the invention, which is defined by the claims hereinbelow. Reference numerals are used to identify structural elements, surfaces, or areas in the drawings, which may be further explained or described by the written specification. The drawings are intended to be read together with the specification and are to be considered a portion of the written description of the invention.

In describing the relative locations of components or subassemblies, the term "front" will refer to the right hand side of the apparatus in FIGS. 1 through 7, that is, the end closer to the driver or passenger, and farther from the windshield. The term "back" has the opposite interpretation. Similarly, the term "up" or "upward" will refer to the roof of the vehicle. Finally, the terms "clockwise" and "counter-clockwise" are always from the perspective of a viewer facing a particular figure.

Figure 1:
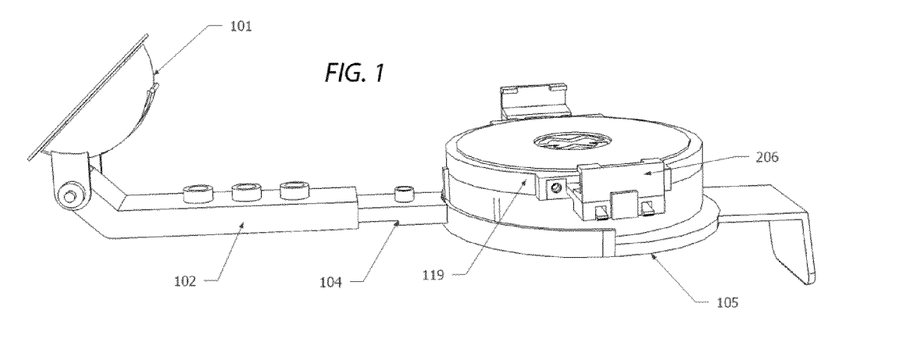
FIG. 1 is a perspective view of an extensible mounting base and electronic device holder, as seen from the side and above, with the mounting base in its folded or un-extended configuration, resting on the dashboard of a vehicle, made according to the invention.

FIG. 1 shows a perspective view of one embodiment of a car mount for an electronic device, comprising two subassemblies: an extensible mounting base (elements 101 through 123) and an electronic device holder (elements 201 through 221). As used herein, the term "electronic device" includes such diverse portable electronic devices as Tablet Computers, PDAs, MP3 players, and smart cell phones. FIG. 1 shows the car mount as it would rest on the top of the dashboard of a motor vehicle, in its folded or un-extended configuration, with suction cup 101 oriented so it may be affixed to the car's windshield. An electronic device (not shown) will be firmly held between hands 206 with the device's screen upward, toward the car's roof, so the screen will not be visible to the driver or other front seat passenger. For some electronic devices, e.g., an MP3 player playing a playlist, little or no user interaction with the electronic device is required, so the invention appropriately places the electronic device, while it is operational, on top of the dashboard. Other electronic devices may require that the user see the device's screen or interact with the device's controls. For such devices, the folded configuration of the extensible mounting base serves to store the electronic device when it is not in use.

Figure 2:
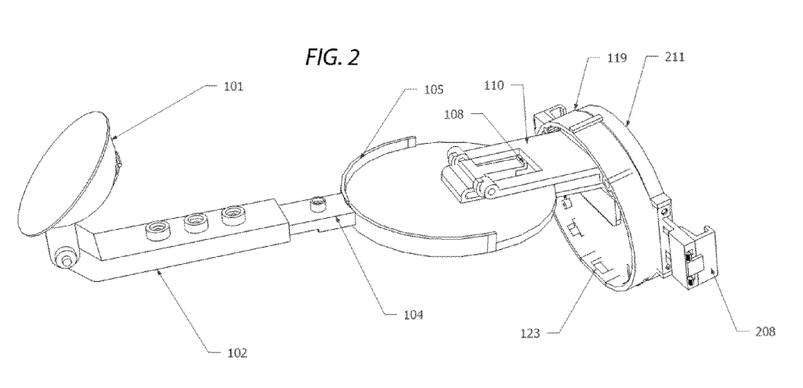
FIG. 2 is a perspective view of an extensible mounting base and electronic device holder, as seen from the side and above, with the base in its unfolded or extended configuration, so as to support an electronic device draped over the front of a vehicle's dashboard.

FIG. 2 shows the car mount with the extensible mounting base extended, so the electronic device will be supported or 'draped' over the front of the vehicle's dashboard. In this unfolded configuration the screen and controls of the electronic device will face the driver or passenger, hence the electronic device may be readily used by either individual. Further, as will be described infra, the electronic device may be rotated in 90 degree increments, so the user may switch between 'landscape' and 'portrait' orientation, as may be preferred for a particular function of the electronic device, such as viewing a map.

Figure 3:
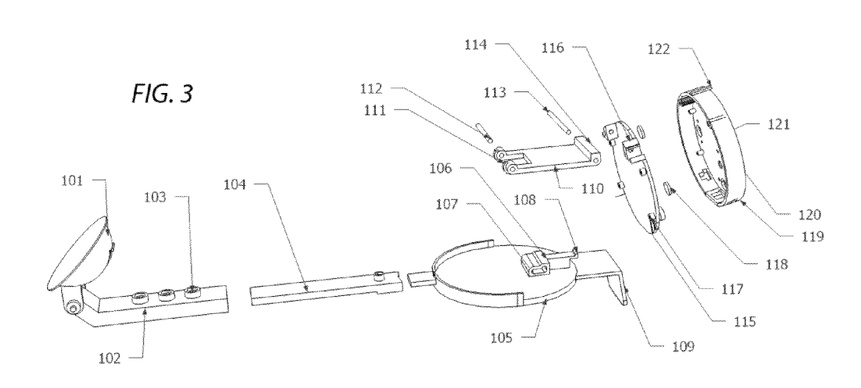
FIG. 3 is an exploded perspective view of an extensible mounting base, as seen from the back and above, in its unfolded configuration.
Figure 4:
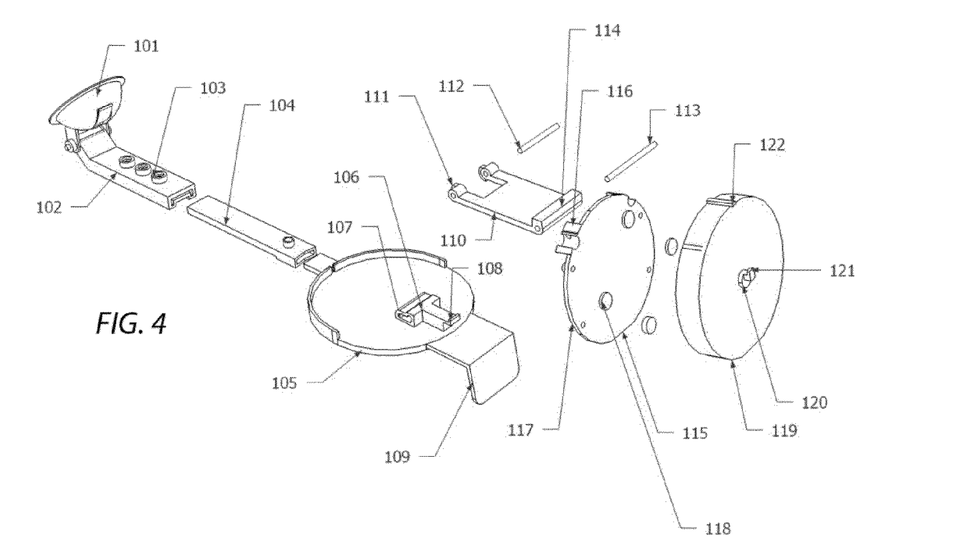
FIG. 4 is an exploded perspective view of an extensible mounting base, corresponding to FIG. 3, as seen from the front and above.

FIGS. 3 and 4 show exploded views of the extensible mounting base, revealing its adaptability for vehicles whose windshield slope and dashboard dimensions may vary greatly, as well as illustrating structures that serve to increase the mechanical stability of the electronic device in a vehicle that will be accelerating, decelerating, and experiencing road-induced vibrations. Further illustrated are the four magnets, 118, spaced 90 degrees apart, which, in conjunction with magnets in the electronic device holder, provide the 90 degree detent stops. As a matter of terminology, the extensible mounting base may itself be described as possessing three subassemblies which are most easily seen in these two figures: a 'base platform' (elements 101 through 109); an 'articulating arm' (element 110) with associated hardware; and a 'holder base' (elements 115 through 123).

Figure 5:
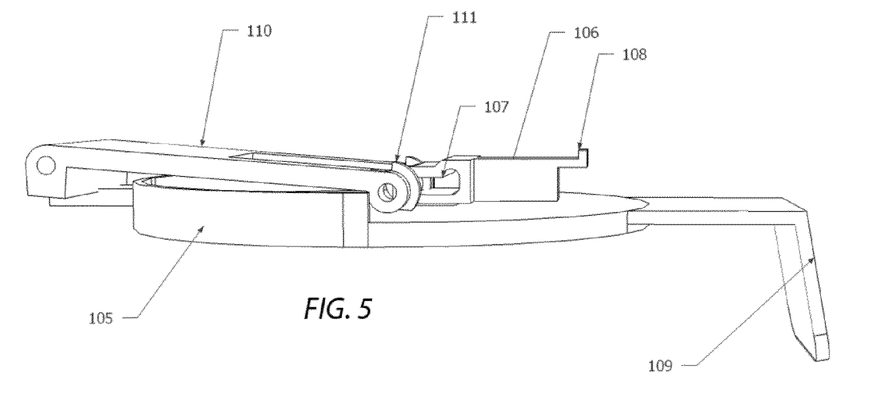
FIG. 5 is a perspective view, as seen from the side and above, of the extensible mounting base's base plate and surrounding structures, when the extensible mounting base is in its folded configuration.

FIG. 5 focuses on a portion of the extensible mounting base while in its folded configuration—base plate 105 and surrounding structures (elements 106 through 108)—that serve to prevent articulating arm 110 from undesired rotational motion, both clockwise and counter-clockwise, which might occur if the vehicle experienced significant accelerations or decelerations.

Figure 6:
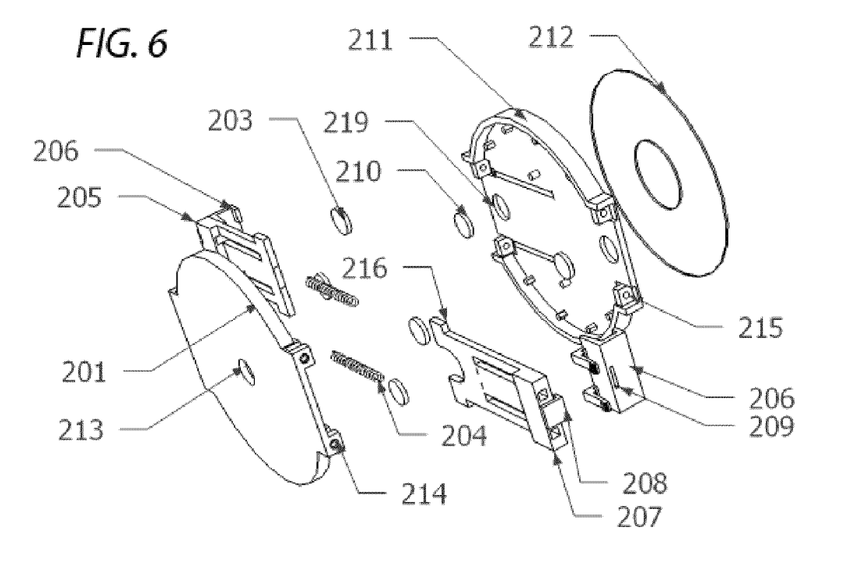
FIG. 6 is an exploded perspective view, as seen from the back and below, of an electronic device holder that rotatably connects to the extensible mounting base of FIG. 4 by means of a center post on the mounting base.
Figure 7:
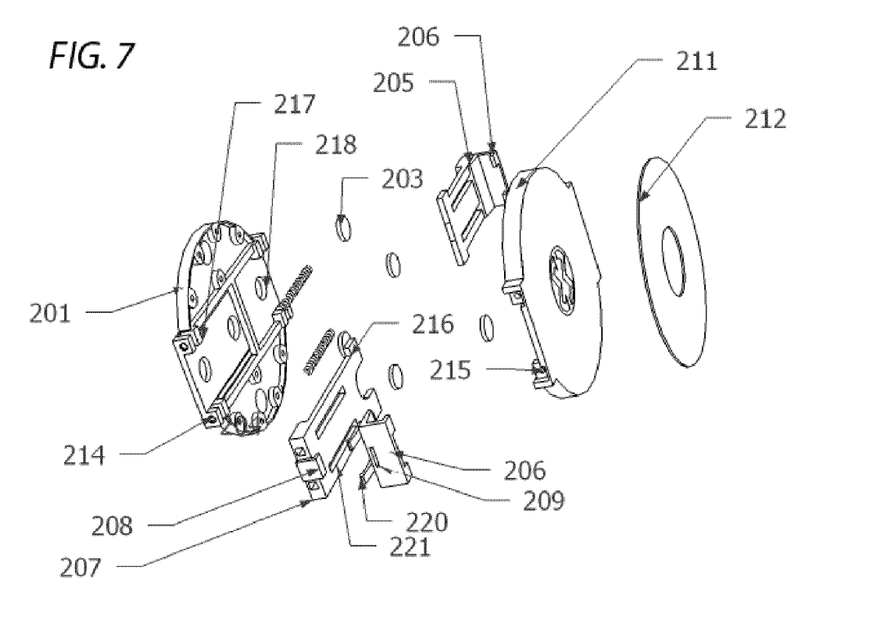
FIG. 7 is an exploded perspective view, as seen from the front and above, of the electronic device holder of FIG. 6, revealing the structure of arms, one of which is spring-loaded, that will grasp an electronic device (the electronic device is not shown).

FIGS. 6 and 7 show exploded views of the electronic device holder, illustrating magnets 203 which exert attractive forces on magnets 118 in the extensible mounting base to provide 90 degree detent stops. These figures also illustrate the structure of hands 206 which grasp an electronic device, as well as arm holder magnets 210, which, attracted to magnets 203, tend to reduce vibration of the hands that might be induced by car vibrations or road irregularities.

Figure 8:
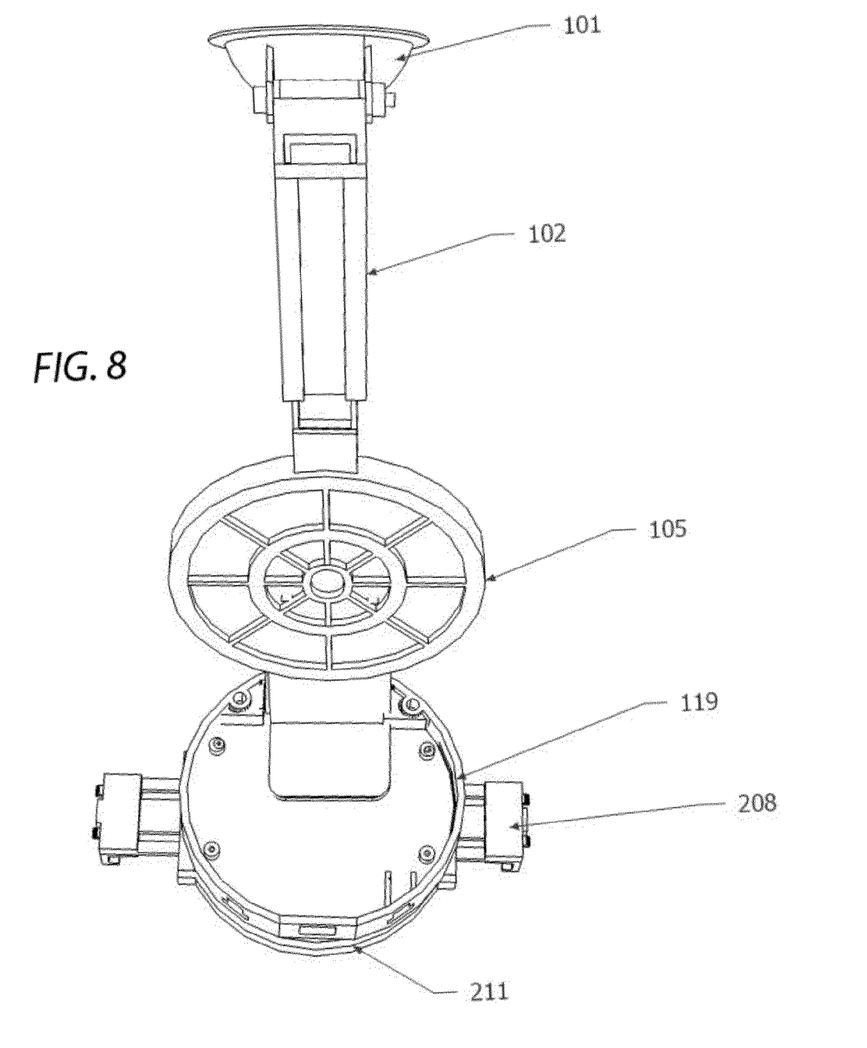
FIG. 8 is a perspective view of the extensible mounting base and electronic device holder, as seen from below and behind, with the base in its extended configuration.

FIG. 8 is a perspective view of a preferred embodiment of the invention, including an extensible mounting base and electronic device holder, from below and behind, with the extensible mounting base in its unfolded configuration.

Figure 9:
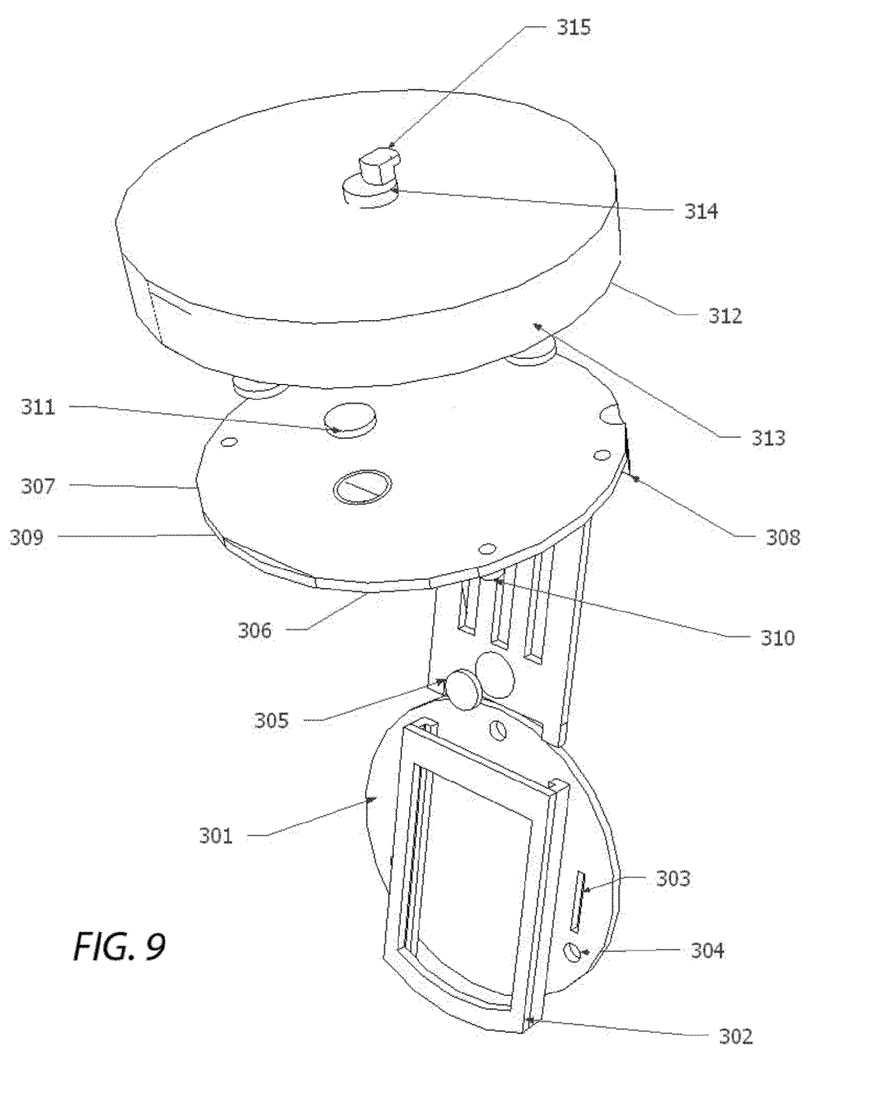
FIG. 9 is an exploded perspective view, as seen from the front and above, of a non-extensible mounting base that includes a wall-attaching plate, permitting an electronic device holder (not shown) to be mounted on a wall or any relatively flat surface.

FIG. 9 is an exploded perspective view of an alternative embodiment of a mounting base subassembly (elements 301 through 316), which is non-extensible, and which includes an attachment to a wall (elements 301 through 304) rather than a suction-cup attachment to a vehicle's windshield or dashboard. The wall attachment may be connected, permanently or temporarily, to a relatively flat surface in a vehicle or a home, which will often be predominantly vertical, but is not required to have any particular orientation. The wall attachment may be affixed to the desired surface by screws passing through screw holes 304, by the use of a strap or belt (not shown) that passes through belt openings 303, or by double-faced tape or hook-and-loop material applied to the back of the wall attachment.

Providing both extensible and non-extensible mounting bases provides a user with a great deal of flexibility for use of their electronic devices. A user may wish to mount a number of wall attachments to different locations in home or vehicle, moving the remainder of the mounting base assembly and the electronic device holder between the various wall attachments. A user may also choose to move only the electronic device holder between a number of fixed non-extensible mounting bases. Yet another alternative is to move only the electronic device itself between, e.g., an extensible mounting base in a car and various non-extensible mounting bases located in one's home.

Figure 10:
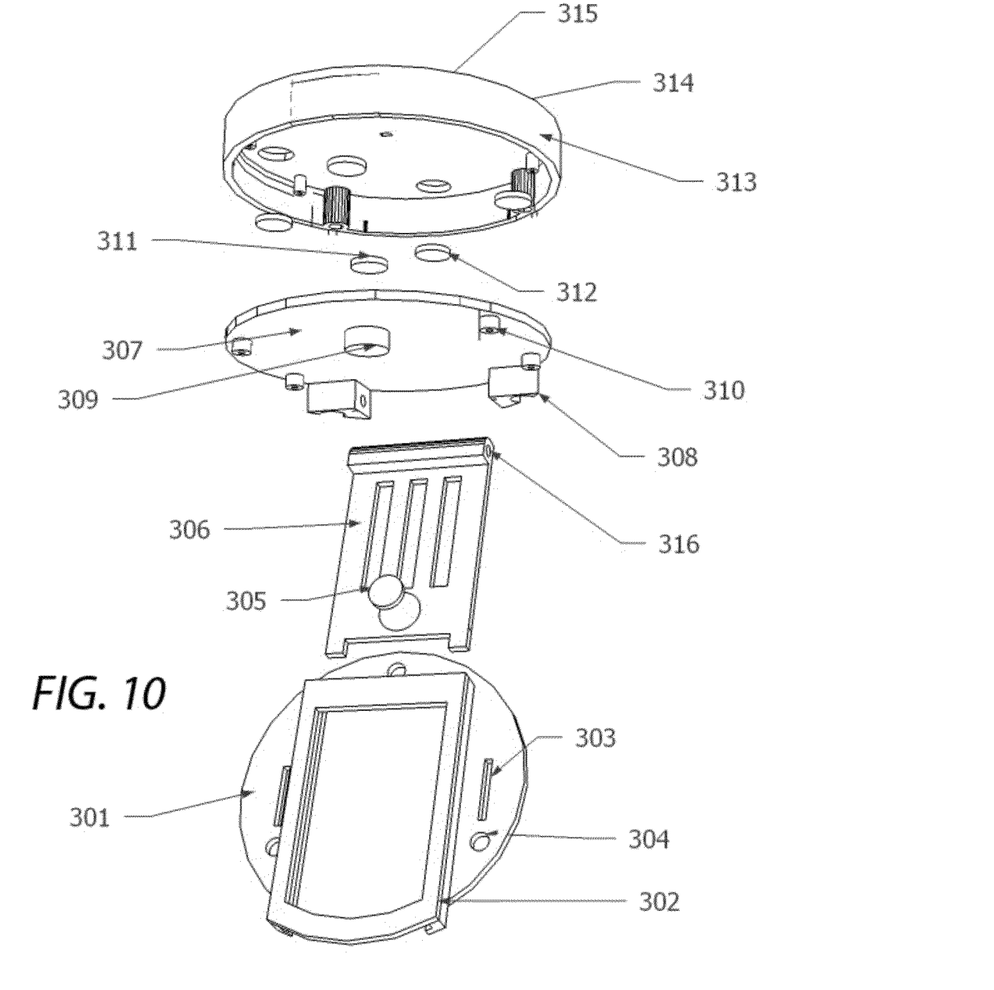
FIG. 10 is an exploded perspective view, as seen from the front and below, corresponding to FIG. 9, of the non-extensible mounting base that includes a wall-attaching plate.

FIG. 10 shows an exploded perspective view of the non-extensible mounting base including its wall attachment. As with the extensible mounting base embodiment, there are magnets (312) that facilitate 90 degree detent stops and magnets (305 and 311) which enhance the overall mechanical stability of the invention, i.e., they prevent extraneous motion of the electronic device holder relative to the wall attachment.

Figure 11:
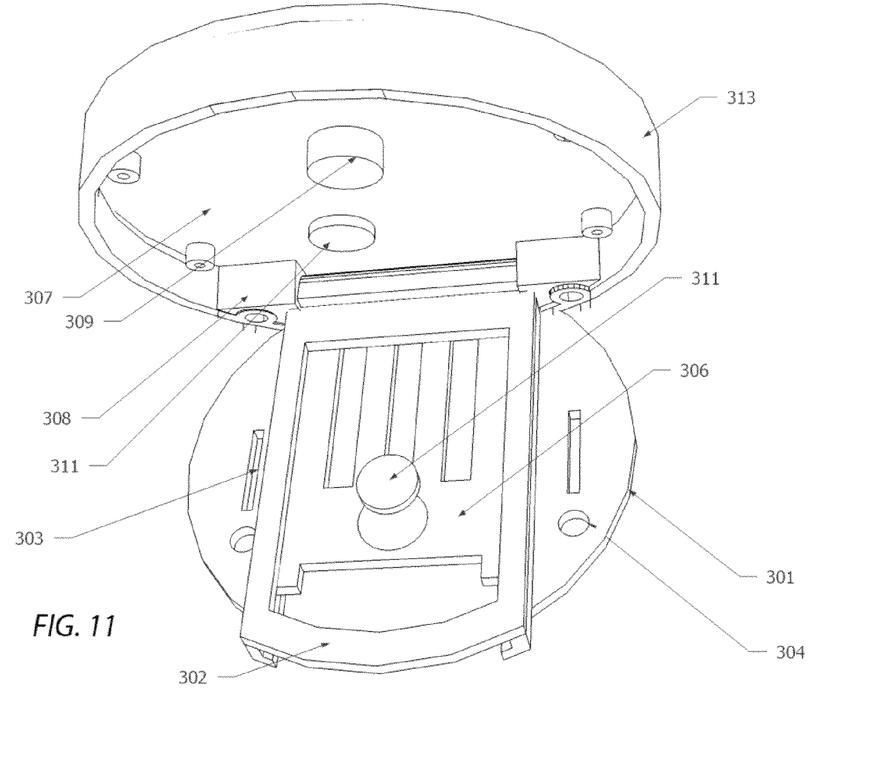
FIG. 11 is a perspective view, as seen from the front and below, of the non-extensible mounting base when it has been fully inserted into its wall-attaching plate, but before the upper structure has been rotated downward so an electronic device holder may be attached to the mounting base's center post.

FIG. 11 shows the non-extensible mounting base after articulating arm 306 has been inserted in its wall attachment, but before the upper portion of the mounting base has been rotated downward to a secure configuration in which an electronic device holder may be connected to the mounting base.

The invention will now be described in greater detail.

FIGS. 3 and 4 show exploded views of a preferred embodiment of the extensible mounting base in its extended configuration, from two different angles, before an electronic device holder has been attached to center post 120. Suction cup 101 connects the extensible mounting base to the vehicle's windshield or dashboard at a suitable angle. Slide 104 is pushed an appropriate distance into slide receptacle 102 and secured by one or more screws passing through screw holes 103 so that an attached electronic device holder will drape over the dashboard of the particular vehicle at a desired location.

A protrusion on the back of base plate 105 fits into an indentation on the front of slide 104. These components may be joined by a screw connection or an appropriate adhesive. Attached to base plate 105 is hinge slide bracket 106, which permits the extensible part of the mounting base (elements 110 through 123) to move between two positions—folded and unfolded. The folded position is illustrated in FIG. 1 in which the extensible part of the mounting base as well as the electronic device holder and an electronic device (not shown), all rest on top of the base plate. The unfolded position of the extensible mounting base is illustrated in FIGS. 2 through 4 and FIG. 8.

Hinge slide bracket 106 possesses hinge pin slide hole 107 through which passes hinge pin 112, providing a rotatable connection to articulating arm 110. Hinge pin slide hole 107 is elongated 'front to back,' permitting the extensible part of the mounting base (elements 110 through 123) to be translated a short distance 'front to back.' Additionally, the hinge pin slide hole becomes narrower, and the center of the hole lowers towards the back of the hinge slide bracket. This aspect of hinge pin slide hole 107 is most clearly illustrated in FIG. 5. As the extensible part of the mounting base, currently resting on base plate 105, is displaced 'front to back,' two things occur that increase the stability of the extensible mounting base in this folded configuration. First, as is illustrated in FIG. 5, hinge cam 111 will serve as a stop, preventing clockwise rotation of articulating arm 110 relative to base plate 105, when articulating arm 110 is near its leftmost position, at which point hinge pin 112 is closest to the base platform. In short, hinge cam 111 prevents the extensible base from unfolding, unless the electronic device holder (or electronic device) is pulled toward the passenger, where hinge pin 112 is free to move slightly upward from the base plate. Second, in the 'displaced to the back' configuration, safety catch 108 passes through safety catch hole 123 (see FIG. 2), preventing counter-clockwise rotation of the extensible portion of the mounting base to any significant degree (i.e., beyond what unavoidable manufacturing tolerances will reasonably permit). In order to unfold the extensible mounting base, therefore, the electronic device holder must be displaced backward, so safety catch 108 first disengages from safety catch hole 123, and then the electronic device holder must be pulled forward and lifted, disengaging hinge cam 111, permitting the device holder to drape over the vehicle's dashboard.

Hinge pin 113 connects articulating arm 110 to hinge bracket 116, permitting both forward displacement of elements 115 through 123 relative to base plate 105, as well as rotation of elements 115 through 123 relative to articulating arm 110 until a protrusion on rotation stop 114 comes in contact with holder base bottom 115. Once contact with the protrusion has been made, articulating arm 110 has a fixed angular position relative to elements 115 through 123, however the articulating arm may still be rotated clockwise, around hinge pin 112, until holder base bottom 115 rests on platform seat 109 at which point the extensible mounting base is fully unfolded.

The remaining structure of the extensible mounting base consists of a holder base upon which an electronic device holder may be rotatably connected. The holder base comprises a holder base bottom 115 and a holder base top 119, connected by screws passing through screw holes 117, as best illustrated in FIG. 3. Between the holder base bottom and holder base top are four magnets 118 that provide 90 degree detent stops. The front surface of holder base top 119 provides a flat surface suitable for mounting an electronic device holder on center post 120. This structure is best illustrated in FIG. 4. The magnetic attraction between magnets 118 in the extensible mounting base and magnets 203 in the electronic device holder should generally be sufficient to maintain a strong connection between the extensible mounting base and the electronic device holder in any landscape or portrait orientation of the electronic device holder, since pairs of attracting magnets are then in close proximity. However, as a safety measure, center post 120 bends upward, terminating in catch 121, which provides additional mechanical support for the electronic device holder at center post hole 213 (see FIG. 6), in the event that the vehicle experiences a significant acceleration or unusually strong vibration, as from encountering a pothole. A further safety element is base projection 122, a protuberance which rises slightly above the surface of holder base top 119. The base projection remains in contact with the outer edge of holder bottom 201, regardless of the rotational orientation of the electronic device holder (see FIGS. 1 and 2), preventing the electronic device holder from sliding up and back relative to the holder base (see FIG. 2).

I now turn to a detailed description of one embodiment of the electronic device holder, which is shown in exploded views in FIGS. 6 and 7, shown attached to a folded mounting base in FIG. 1, and shown attached to an unfolded mounting base in FIGS. 2 and 8. Fundamentally, this subassembly consists of holder bottom 201 attached to holder top 211 by screws that pass through screw holes 214 and 215. Four magnets 203 are affixed to holder bottom 201 at 90 degree orientations, resting in magnet indentations 218 and optionally further secured with a suitable adhesive.

Between holder bottom and holder top are two arms, at least one of which is spring-loaded, terminating in hands 206 that are capable of grasping an electronic device. In the particular embodiment shown in FIGS. 6 and 7, there is a single spring-loaded arm 207 employing springs 204 that are confined to a space between holder bottom and holder top that terminates at one end at spring trap 216 and at the other end at spring trap 217. Springs 204, which are always in compression, exert forces on the spring-loaded arm which in turn exerts forces on hand 206 that are directed inward toward the center of the electronic device holder, resulting in a firm grasp on an electronic device, if one is present. Hand 206 is secured to spring-loaded arm 207 by holder legs 220 which fit into, and are free to slide along, holder leg slots 221 until notch 208 fits into notch hole 209.

In FIGS. 6 and 7 the second arm, free arm 205, is not spring-loaded, and this arm similarly terminates in a device-grasping hand 206. Hands 206 are easily removed from their respective arms and replaced with hands of different dimensions, as appropriate for electronic devices of different physical dimensions.

Also contained within the electronic device holder are two arm holder magnets 210. These magnets, placed in magnet holes 219, will exert attractive forces on magnets 203, tending to draw the holder bottom closer to the holder top, reducing undesired motion of the electronic device holder's internal components during vehicle acceleration. The front surface of holder top 211 is covered by cover pad 212, which may be made from rubber or silicone or similar material that is smooth enough to reduce the likelihood of scratches on the underside of the electronic device, and has a high enough coefficient of friction that the mechanical connection between the electronic device holder and the electronic device will be enhanced. As previously noted, the electronic device holder rests on center post 120 and is further stabilized by catch 121.

Another embodiment of a mounting base is non-extensible, and is illustrated in FIGS. 9 through 11. The non-extensible mounting base might be placed in a non-moving location, such as the wall of a home, or in a moving location, such as the back of the headrest of a vehicle, permitting passengers in the rear seats of the vehicle to use the electronic device. As with the extensible mounting base, the electronic device holder will rest on a center post 314 and will be further secured by a catch 315. The basic 'clamshell' structure of this mounting base consists of base plate 307 connected to base cover 313 by screws that pass through screw holes 310. Between the base plate and the base cover are four magnets 312 affixed to base plate 307 that serve to provide 90 degree detent stops, as well as a single plate magnet 311 that will, as described infra, serve to stabilize the removable assembly of the non-extensible mounting base (elements 305 through 315) relative to the assembly that will be attached to the wall or vehicle headrest (elements 301 through 304). This latter assembly consists of wall-attaching plate 301 which contains hinge receptacle 302, screw holes 304, and belt openings 303. The latter two elements permit the attachment of the wall-attaching plate to a relatively flat surface by, respectively, screws, and a strap or belt that would wrap around, e.g., a vehicle's headrest.

The clamshell structure of base plate 307 and base cover 313 is rotatably connected to articulating arm 306 by a hinge pin (not shown) that passes through channel 316 at the upper end of the articulating arm and through hinge bracket 308. In use, the lower 'prong' end of articulating arm 306 is inserted into hinge receptacle 302 (see FIG. 11) and the clamshell structure is rotated downward, until the underside of base plate 307 rests against the surface of hinge receptacle 302. At this point, hinge magnet 305, embedded in articulating arm 306, will be attracted to plate magnet 311, embedded in magnet housing 309, securing an attached electronic device holder against any undesired vibration-induced motion.

USE OF THE INVENTION

In operation, the invention is used as follows. In the context of using this invention on the dashboard of a motor vehicle, the user will connect the extensible mounting base to the vehicle windshield with suction cup 101. An adjustment for the vehicle's dashboard dimensions will be made by changing the degree of insertion of the slide in the slide receptacle and tightening the screw that passes through screw hole 103. The electronic device holder will be placed on top of the extensible mounting base at center post 120 and the device holder will be rotated to any of the provided detent stops. An electronic device may be placed between hands 106 at this point, by pulling on the hand 206 of a spring-loaded arm 207 to create an adequate gap for insertion of the device and subsequently releasing the hand. The invention is now in the folded configuration as illustrated in FIG. 1.

When it is desired to unfold the extensible mounting base, the user will first pull forward either on the electronic device or the electronic device holder, so as to disengage safety catch 108 from safety catch hole 123, and will then lift the device or the device holder up and forward toward the user, until holder base bottom 115 rests on platform seat 109. The electronic device may now be rotated at 90 degree increments to a preferred landscape or portrait orientation.

As numerous modifications and changes will readily occur to those possessing ordinary skill in the art, it is not desired to limit the invention to the exact construction and operation shown and described, and accordingly, all suitable modifications and equivalents may be resorted to, still falling within the scope of the invention. This includes, for example, the optimum dimensional relationships for the parts of the invention, to include variations in size, material, shape, form, function and manner of operation, assembly, and use.

One example of a readily apparent modification is to provide detent stops at angular spacings at other than 90 degree increments by providing additional magnets in the extensible mounting base and the electronic device holder (e.g., every 30 or 45 degrees). Such additional orientations might prove useful if the invention was located in the center of the dashboard, as the user might be the driver or the front seat passenger, and both individuals would be viewing the electronic device from an oblique angle.

Other readily apparent modifications of the present invention include a variety of means for affixing an electronic device to an electronic device holder. In addition to the use of spring-loaded arms, extending radially outward from an electronic device holder, terminating in interchangeable hands of various dimensions would grasp an electronic device, an individual having ordinary skill in the art might employ: a hook-and-loop connection between device and device holder; an elastic band affixed to the device holder that would encircle the device; a pair of attracting magnets adhesively connected to device and device holder; and double-faced tape affixed to device and device holder.

Still another modification of the invention would replace suction cup 101, whose airtight connection with a windshield or dashboard is subject to occasional failure, with a hook-and-loop fastener (such as is used in the E-ZPass System™) which permanently affixes hook or loop material to the windshield or dashboard with a suitable adhesive, and the complementary fabric component to a suitable location on slide receptacle 102.

In sum, having described certain embodiments of the invention, it should be understood that the invention is not limited to the above description or the attached exemplary drawings. Rather, the invention is defined by the claims appearing hereinbelow and equivalents thereof that would be obvious to one of ordinary skill in the art.

What is claimed is:

1. A car mount for a driver/passenger-usable electronic device, comprising:
    a base plate that releasably attaches to a vehicle's windshield or dashboard;
    an articulating arm possessing two ends: a first end pivotably secured to said base plate, and a second end;
    a holder base pivotably secured to said second end of said articulating arm, said holder base being movable between a folded position in which said holder base is secured on top of said base plate, and a unfolded position in which said holder base rests on the front face of the dashboard closer to the driver;
    an electronic device holder, capable of securely grasping an electronic device, said electronic device holder rotatably connected to said holder base;
    wherein the rotatable connection between said holder base and said electronic device holder enables a user to rotate an electronic device held in said electronic device holder around an axis perpendicular to the front face of the electronic device and selectively orient the electronic device at desired angular orientations.

2. The device of claim 1 wherein the electronic device holder may be removed from the holder base.

3. The device of claim 2 wherein the base plate releasably attaches to a vehicle's windshield or dashboard by a suction-cup or by a hook-and-loop fastener.

4. The device of claim 3, further comprising detent stops between said electronic device holder and said holder base, securing the electronic device at desired angular orientations.

5. The device of claim 4, wherein said detent stops are provided by sets of magnets, one set disposed inside the electronic device holder, the other set disposed inside the holder base, such that at each desired angular orientation, magnets line up in pairs, with opposing magnetic poles facing each other.

6. The device of claim 5, wherein the base plate sits on the top surface of said dashboard.

7. The device of claim 6, wherein said electronic device holder employs device-grasping means to releasably hold an electronic device.

8. The device of claim 7, wherein the holder base, while situated in its folded position, is stabilized against vehicular accelerations that would tend to induce clockwise rotation of said articulating arm around its first end, by a cam situated at the first end of said articulating arm, said cam serving as a rotational stop for the articulating arm by exerting contact forces on said base plate, securing the holder base until the electronic device is pulled towards the user, causing the cam to disengage, which allows the articulating arm to rotate clockwise around its first end, thereby permitting the holder base to be moved towards its unfolded position.

9. The device of claim 8, wherein the holder base, while situated in its folded position, is stabilized against vehicular accelerations that would tend to induce counter-clockwise rotation of said articulating arm around its second end, by the passage of a safety catch on the front end of said base plate passing through a safety catch hole on the front end of said holder base, securing the electronic device until the electronic device is pulled toward the user, disengaging said safety catch from the safety catch hole, permitting the articulating arm to rotate counter-clockwise around its second end, and thereby permitting the holder base to be moved towards its unfolded position.

10. The device of claim 9, further comprising a platform seat affixed to said base plate, which will support said holder base in its unfolded position at a suitable angle for a driver or passenger to view the upper surface of an electronic device.

11. A mount for an electronic device, comprising:
    a wall-attaching plate possessing a hinge receptacle, said plate securable to a flat surface;
    an articulating arm possessing two ends, a first end having a prong that is fittable into said hinge receptacle on said wall-attaching plate, and a second end;
    a holder base pivotably secured to the second end of said articulating arm which is rotatable downwardly so the underside of the holder base rests against said wall-attaching plate;
    an electronic device holder, capable of grasping an electronic device, said device holder rotatably connected to said holder base;
    wherein a connection between said holder base and said electronic device holder enables a user to rotate the electronic device around an axis perpendicular to the front face of the device, and selectively orient the electronic device at desired angular orientations.

12. The device of claim 11 wherein said electronic device holder may be removed from the holder base.

13. The device of claim 12, further comprising detent stops between said electronic device holder and said holder base, securing the electronic device at desired angular orientations.

14. The device of claim 13, wherein said detent stops are provided by sets of magnets, one set disposed inside the electronic device holder, the other set disposed inside the holder base, such that at each desired angular orientation, magnets line up in pairs, with opposing magnetic poles facing each other.

15. The device of claim 14, further comprising either a pair of magnetically attracting elements or hook-and-loop elements, that will matingly engage when the underside of the holder base rests against said wall-attaching plate, one fastening element being affixed to the underside of said holder base, the other fastening element being affixed to the front surface of the articulating arm.

16. An electronic device holder, employing device-grasping means to releasably hold an electronic device, said device holder being interchangeably connectable to a wall mount or to a dashboard/windshield mount, and employing a rotatable connection to said mount, enabling a user to rotate said electronic device around an axis perpendicular to the front face of the electronic device, and selectively orient the electronic device at desired angular orientations; wherein the wall mount comprises:
    a wall-attaching plate possessing a hinge receptacle, said plate securable to a flat surface;
    an articulating arm possessing two ends, a first end hingedly attachable to said wall-attaching plate, and a second end;
    a holder base pivotably secured to the second end of said articulating arm which is rotatable downwardly so the underside of the holder base rests against said wall-attaching plate.

17. An electronic device holder, employing device-grasping means to releasably hold an electronic device, said device holder being interchangeably connectable to a wall mount or to a dashboard/windshield mount, and employing a rotatable connection to said mount, enabling a user to rotate said electronic device around an axis perpendicular to the front face of the electronic device, and selectively orient the electronic device at desired angular orientations; wherein the dashboard/windshield mount comprises:
- a base plate that releasably attaches to a vehicle's windshield or dashboard;
- an articulating arm possessing two ends: a first end pivotably secured to said base plate, and a second end;
- a holder base pivotably secured to said second end of said holder base, the holder base being movable between a folded position in which said holder base is secured on top of said base plate, and a unfolded position in which said holder base rests on the front face of the dashboard closer to the driver;
- wherein a rotatable connection between said holder base and said electronic device holder enables a user to rotate an electronic device held in said device holder around an axis perpendicular to the front face of the electronic device and selectively orient the electronic device at desired angular orientations.

18. The device as in claim 16 or 17, further comprising detent stops between said electronic device holder and said holder base, securing the electronic device at desired angular orientations, said detent stops are provided by sets of magnets, one set disposed inside the electronic device holder, the other set disposed inside the holder base, such that at each desired angular orientation, magnets line up in pairs, with opposing magnetic poles facing each other.

* * * * *